United States Patent
Schmid et al.

(10) Patent No.: US 10,645,037 B2
(45) Date of Patent: May 5, 2020

(54) SYSTEMS AND METHODS FOR GENERATING AND PROCESSING ACTION-BASED LINKS

(71) Applicant: Facebook, Inc., Menlo Park, CA (US)

(72) Inventors: Matthew Logan Schmid, New York, NY (US); Timothy J. McDuffie, Westport, CT (US); Guangwei Zhang, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 316 days.

(21) Appl. No.: 15/189,992

(22) Filed: Jun. 22, 2016

(65) Prior Publication Data
US 2017/0373993 A1    Dec. 28, 2017

(51) Int. Cl.
| | | |
|---|---|---|
| G06F 3/0482 | (2013.01) | |
| H04L 12/58 | (2006.01) | |
| H04L 29/08 | (2006.01) | |
| H04W 4/12 | (2009.01) | |
| G06F 3/0484 | (2013.01) | |
| G06Q 10/10 | (2012.01) | |
| G06Q 50/00 | (2012.01) | |
| G06Q 10/06 | (2012.01) | |

(52) U.S. Cl.
CPC .......... H04L 51/04 (2013.01); G06F 3/0482 (2013.01); G06F 3/04842 (2013.01); G06Q 10/06311 (2013.01); G06Q 10/107 (2013.01); G06Q 50/01 (2013.01); H04L 51/18 (2013.01); H04L 67/02 (2013.01); H04W 4/12 (2013.01); H04L 51/32 (2013.01)

(58) Field of Classification Search
CPC .................................. H04L 51/04; H04L 51/32
See application file for complete search history.

(56) References Cited

U.S. PATENT DOCUMENTS

| | | | |
|---|---|---|---|
| 9,152,312 B1 * | 10/2015 | Terleski | G06F 3/0488 |
| 9,286,263 B1 * | 3/2016 | Collins | H04L 67/36 |
| 9,626,647 B2 * | 4/2017 | Pierce | G06Q 10/10 |
| 2009/0063635 A1 * | 3/2009 | Pierce | G06Q 10/10 709/205 |
| 2010/0262619 A1 * | 10/2010 | Zargahi | G06F 8/61 707/770 |
| 2012/0110064 A1 * | 5/2012 | Chen | H04W 4/21 709/203 |
| 2014/0095583 A1 * | 4/2014 | Houle | G06F 17/2247 709/203 |
| 2015/0143248 A1 * | 5/2015 | Beechuk | H04L 67/10 715/739 |
| 2015/0153939 A1 * | 6/2015 | Neeleman | G06F 3/1204 715/207 |
| 2015/0188873 A1 * | 7/2015 | Halliday | H04W 4/21 709/206 |
| 2015/0220500 A1 * | 8/2015 | Katic | G06F 17/30899 715/207 |

(Continued)

*Primary Examiner* — Justin S Lee
(74) *Attorney, Agent, or Firm* — Sheppard Mullin Richter & Hampton LLP

(57) ABSTRACT

Systems, methods, and non-transitory computer-readable media can receive an action-based link associated with an action and a user. A set of metadata associated with the action-based link is received. An action-based link preview is generated based on the set of metadata, wherein the action-based link preview comprises the action-based link and a call to action object associated with the action.

19 Claims, 9 Drawing Sheets

(56) References Cited

U.S. PATENT DOCUMENTS

| | | | |
|---|---|---|---|
| 2015/0340037 A1* | 11/2015 | Kim | G10L 15/26 704/235 |
| 2016/0105383 A1* | 4/2016 | Seymour | H04L 51/18 709/205 |
| 2016/0313906 A1* | 10/2016 | Kilchenko | G06F 3/04847 |
| 2016/0352659 A1* | 12/2016 | Krishnamoorth | H04L 51/046 |
| 2017/0068646 A1* | 3/2017 | Beechuk | H04W 4/21 |
| 2017/0148055 A1* | 5/2017 | Boothroyd | G06Q 30/0254 |
| 2017/0178223 A1* | 6/2017 | Ranasinghe | G06Q 30/0633 |
| 2017/0295122 A1* | 10/2017 | Pfriem | H04L 51/04 |
| 2018/0025439 A1* | 1/2018 | Chandran | G06Q 50/01 |

* cited by examiner

US 10,645,037 B2

SYSTEMS AND METHODS FOR GENERATING AND PROCESSING ACTION-BASED LINKS

FIELD OF THE INVENTION

The present technology relates to the field of social networking systems. More particularly, the present technology relates to generating and processing action-based links.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users of a social networking system can be provided with a user interface to interact with other users on a social networking system. In certain contexts, individual users can be distinguished from entity users on the social networking system. For example, an entity user or an entity account be associated with a particular entity, and can be controlled by one or more administrators of an entity account, whereas an individual user is associated with a particular individual. Both individual users and entity users can interact with one another on the social networking system by, for example, sending messages to one another, posting content to other users' accounts, sharing content publically for publication to other users' newsfeeds, and the like. Interactions between users on a social networking system can be mutually beneficial. Participation in the social networking system by users can be encouraged and promoted by improving tools and features to facilitate interaction on the social networking system.

SUMMARY

Various embodiments of the present disclosure can include systems, methods, and non-transitory computer readable media configured to receive an action-based link associated with an action and a user. A set of metadata associated with the action-based link is received. An action-based link preview is generated based on the set of metadata, wherein the action-based link preview comprises the action-based link and a call to action object associated with the action.

In an embodiment, the action-based link is a messaging action-based link, and the action is messaging the user.

In an embodiment, an indication is received that the action-based link has been selected by a first user on a first computing device.

In an embodiment, in response to the receiving the indication that the action-based link has been selected, a plurality of messaging interfaces is presented on the first computing device for selection by the first user. A selection of a messaging interface is received from the first computing device.

In an embodiment, the presenting the plurality of messaging interfaces for selection by the first user comprises selecting a subset of a plurality of potential messaging interfaces based on selection criteria; and presenting the subset of the plurality of potential messaging interfaces on the first computing device for selection by the first user.

In an embodiment, the selection criteria comprise a computing device determination.

In an embodiment, the computing device determination comprises determining whether the computing device is a mobile device.

In an embodiment, the plurality of messaging interfaces comprises a mobile messaging application interface.

In an embodiment, selection of the action based link results in display of a first messaging interface, and selection of the call to action object results in display of a second messaging interface different from the first messaging interface.

In an embodiment, an indication is received that the action-based link has been selected by a first user on a first computing device, a messaging interface is selected from a plurality of messaging interfaces based on selection criteria, and the messaging interface is presented on the first computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
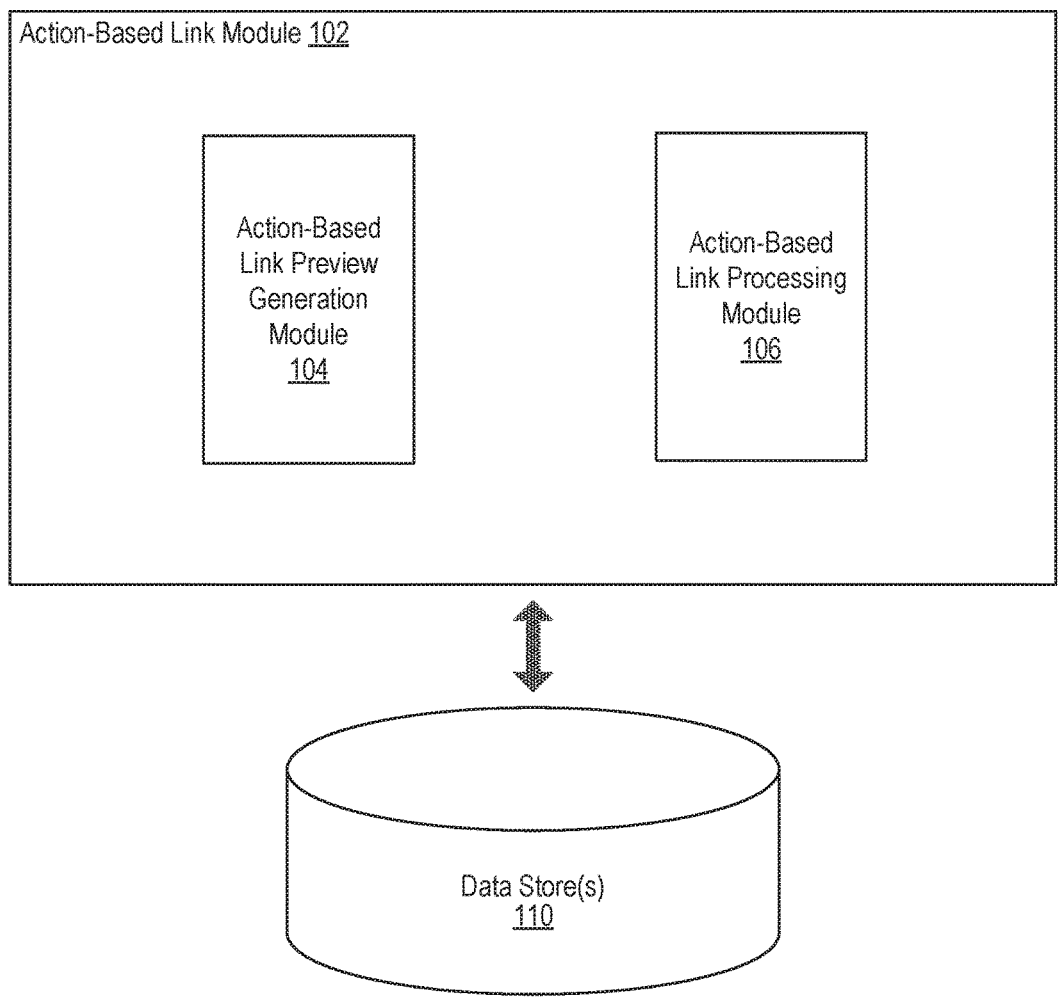
FIG. 1 illustrates an example system including an action-based link module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Generating and Processing Action-Based Links

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

Users of a social networking system can be provided with a user interface to interact with other users on a social networking system. In certain contexts, individual users can be distinguished from entity users on the social networking system. For example, an entity user or an entity account be associated with a particular entity, and can be controlled by one or more administrators of an entity account, whereas an individual user is associated with a particular individual. Both individual users and entity users can interact with one another on the social networking system by, for example, sending messages to one another, posting content to other users' accounts, sharing content publically for publication to other users' newsfeeds, and the like. Interactions between users on a social networking system can be mutually beneficial. For example, a customer individual user may wish to contact an entity user associated with a product manufacturer to ask questions or provide feedback about products or services offered by the product manufacturer. The product manufacturer may wish to create positive interactions with individual customers to improve its reputation in the marketplace. Participation in the social networking system by users can be encouraged and promoted by improving tools and features to facilitate interaction on the social networking system.

It continues to be an important interest for a social networking system to improve the experience of users interacting with one another on the social networking system. Continued user interaction on the social networking is an important aspect of maintaining continued interest in and participation on the social networking system. A social networking system can include one or more messaging interfaces to facilitate the exchange of messages between users on the social networking system. Certain messaging interfaces may be preferable to others depending on a particular user's situation. For example, a user on a mobile device may find it more convenient to exchange messages on a mobile messaging application, whereas a user on a desktop computer may prefer to exchange messages using a web browser-based messaging interface. However, when a user shares a web address (or web link) to direct other users to a messaging interface to interact with the user, it is generally the case that the link will lead to the same messaging interface for all users. That is, it can be difficult for a user, trying to encourage interaction and messaging, to advertise a single web link that will be convenient for multiple users utilizing different computing devices and computing platforms.

An improved approach rooted in computer technology overcomes the foregoing and other disadvantages associated with conventional approaches specifically arising in the realm of computer technology. Based on computer technology, the disclosed technology can generate and process action-based links. In certain embodiments an action-based link can be associated with a particular action. For example, an action-based link can be provided that is associated with the action of messaging another user, i.e., a messaging action-based link. Consider the example of an entity user that wishes to share a link that would allow other users on a social networking system to directly message the entity user. The social networking system can provide the entity user with an action-based link that, when accessed by another user, directs the other user to a messaging interface to message the entity user. In certain embodiments, when a user shares an action-based link on a social networking system, a preview of the action-based link can be generated. Generating the preview of the action-based link can comprise creating a call to action object based on the particular action associated with the action-based link. For example, the preview for a messaging action-based link can include a button that another user can click to open a messaging interface. Furthermore, in certain embodiments, where multiple messaging interfaces are available, a messaging interface can be selected based on various factors, including the device being used, and the manner in which the messaging interface was requested. These concepts will be described in greater detail below with reference to the figures.

FIG. 1 illustrates an example system 100 including an example action-based link module 102 configured to generate and process action-based links, according to an embodiment of the present disclosure. An action-based link can be associated with a particular action. In certain embodiments, the action-based link can also be associated with a particular user. For example, a messaging action-based link can be associated with the action of messaging a particular user, such that another user who selects the messaging action-based link is directed to a messaging interface to exchange messages with the particular user. The action-based link module 102 can be configured to generate a preview based on an action-based link. In certain embodiments, the preview can comprise a call to action object based on the action associated with the action-based link. For example, in the messaging action-based link discussed above, the call to action object can comprise a button that, when selected by a first user, opens a messaging interface on the first user's device to allow the first user to message a second user associated with the action-based link. The action-based link module 102 can also be associated with processing an action-based link. Processing of the action-based link can comprise determining an appropriate action to take in response to a user selecting the action-based link. For example, if a first user shares a messaging action-based link, and a second user selects the messaging action-based link on their computing device, processing of the action-based link can comprise determining an appropriate messaging interface to open on the second user's computing device.

As shown in the example of FIG. 1, the action-based link module 102 can include an action-based link preview generation module 104 and an action-based link processing module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The action-based link preview generation module 104 can be configured to generate a preview based on an action-based link. A preview can be useful, for example, if a user shares an action-based link on a social networking system. The preview of the action-based link can provide other users with information relating to the action-based link. For example, if a user shares a messaging action-based link that is associated with a particular user, the messaging action-based link can be configured such that selection of the messaging action-based link initiates message exchange with the particular user. The preview for the messaging action-based link can include, for example, a title identifying the action to be taken by selecting the action-based link, and the particular user associated with the action-based link. For a messaging action-based link, the title might read, for example, "Send a message to User A." This informs other users that when they select the action-based link, they can expect to be taken to a messaging interface to exchange message with User A. In certain embodiments, the action-based link preview can be generated by scraping metadata associated with the action-based link and generating a preview based on the metadata. The metadata can include action information indicative of a particular action associated with the action-based link. The metadata can also include user information indicative of a particular user associated with the action-based link.

In certain embodiments, the preview for an action-based link can also comprise a call to action object. The call to action object can be generated based on the particular action associated with the action-based link. In the example of the messaging action-based link, the call to action object can include a button that, when selected, takes the user to a messaging interface. In certain embodiments, the call to action object can be generated based on metadata associated with the action-based link, e.g., metadata identifying the particular action associated with the action-based link. In other embodiments, the call to action object and/or the preview can be generated based on the URL of the action-based link. For example, if the action-based link URL is formatted in a particular manner, e.g., messaging.socialnetwork.com/username, this can indicate that the action associated with the action-based link is "messaging" and the particular user associated with the action-based link is "username." The action-based link preview generation module 104, and action-based link previews, are discussed in greater detail below with reference to various example scenarios.

The action-based link processing module 106 can be configured to take appropriate action based on selection of an action-based link. For example, a social networking system can comprise multiple messaging interfaces, such as a web browser-based messaging page interface, a web browser-based chat box messaging interface, a mobile web browser-based messaging interface, and a mobile application messaging interface. If a user selects a messaging action-based link, the action-based link processing module 106 can be configured to determine and select an appropriate messaging interface based on various selection factors. For example, selection of an appropriate messaging interface can be based, at least in part, on the type of device being used by the user that selected the action-based link. If the user is on a mobile device, then the selection can be narrowed to a mobile web browser-based messaging interface and a mobile application messaging interface. Conversely, if the user is on a laptop or desktop computing device, then the selection can be narrowed to the web browser-based messaging page interface, or a web browser-based chat box messaging interface. Selection of an appropriate messaging interface can also be based, at least in part, on how the user accessed the messaging interface. For example, if a user clicks on the action-based link, that may result in a particular messaging interface, whereas if a user clicks on a call to action object from a preview of the action-based link, that may result in a different messaging interface. The action-based link processing module 106 is discussed in greater detail herein with reference to various example scenarios.

The action-based link module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the action-based link module 102 can be implemented, in part or in whole, as software running on one or more computing devices or systems, such as on a server computing system or a user (or client) computing system. For example, the action-based link module 102 or at least a portion thereof can be implemented as or within an application (e.g., app), a program, or an applet, etc., running on a user computing device or a client computing system, such as the user device 610 of FIG. 6. In another example, the action-based link module 102 or at least a portion thereof can be implemented using one or more computing devices or systems that include one or more servers, such as network servers or cloud servers. In some instances, the action-based link module 102 can, in part or in whole, be implemented within or configured to operate in conjunction with a social networking system (or service), such as the social networking system 630 of FIG. 6. It should be understood that there can be many variations or other possibilities.

The action-based link module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the action-based link module 102. For example, the data store 110 can store action-based link metadata, computing device information, action-based link interaction data, and the like. It is contemplated that there can be many variations or other possibilities.

Figure 2:
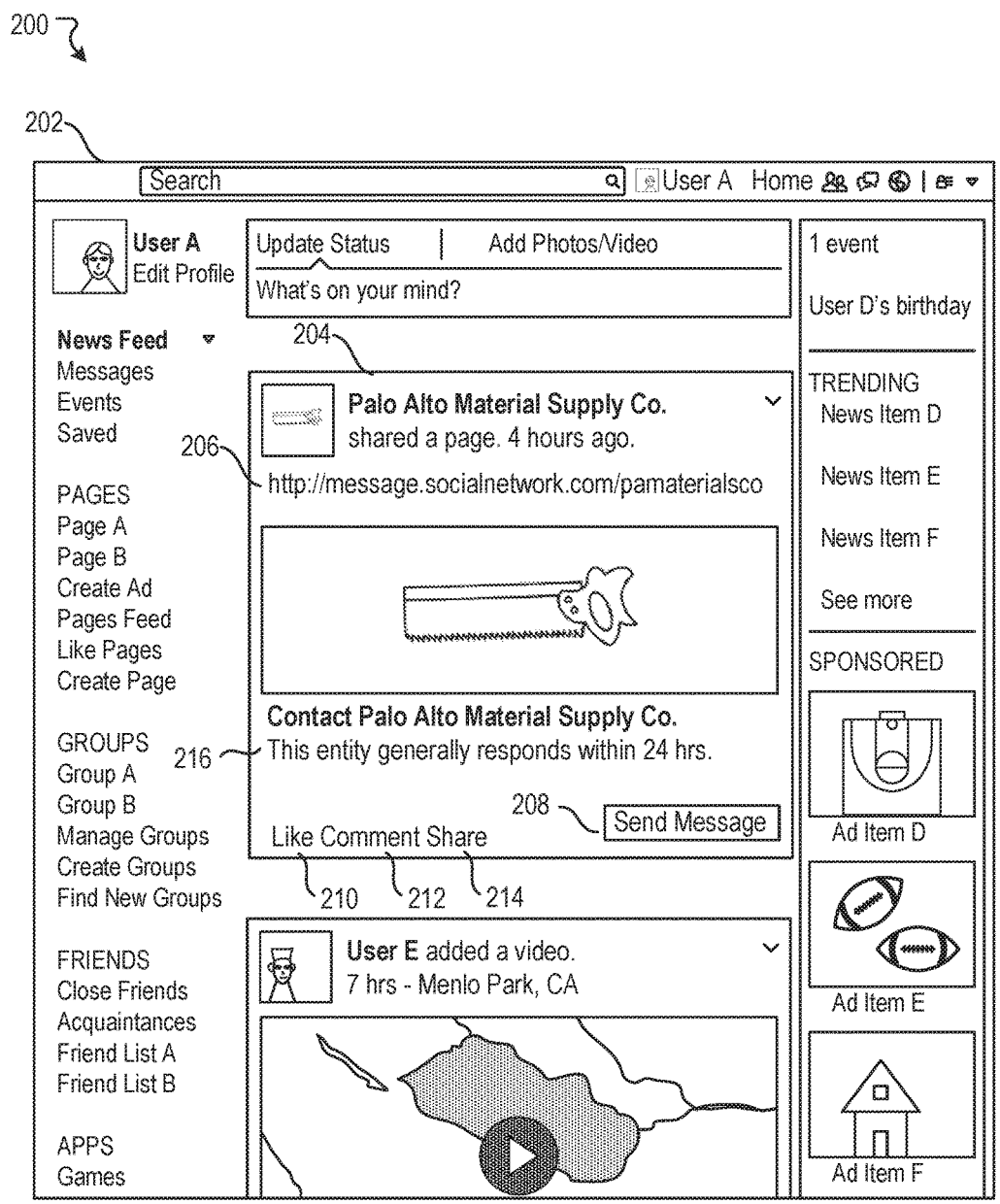
FIG. 2 illustrates an example scenario associated with generating an action-based link preview, according to an embodiment of the present disclosure.

FIG. 2 illustrates an example scenario 200 associated with generating an action-based link preview. The example scenario 200 includes a user interface 202 (in this case, a social networking system newsfeed), including an action-based link preview 204. In this example scenario 200, an entity user, Palo Alto Material Supply Co., has shared a messaging action-based link on a social networking system. The messaging action-based link comprises a web link 206 (http://message.socialnetwork.com/pamaterialsco). The social networking system has generated an action-based link preview 204, which appears as a story in a news feed of an individual user, User A. Like other stories in User A's news feed, User A can like, comment on, and/or share the story via buttons 210, 212, and 214, respectively. The action-based link preview 204 includes the web link 206, as well as a call to action object 208. In this case, the call to action object 208 is a button labeled "Send Message," which, when selected by User A, will open up a messaging interface for User A to exchange messages with the Palo Alto Material Supply Co. The user can open up a messaging interface with Palo Alto Material Supply Co. by either selecting the web link 206, or by selecting the call to action object 208.

The action-based link preview 204 can be generated based on various characteristics of the action-based link. In certain embodiments, when a user provides an action-based link, the action-based link can be scraped for metadata, which can then be utilized to generate the action-based link preview 204. For example, in this scenario 200, the Palo Alto Material Supply Co. provided the web link 206 to be shared on a social networking system. The web link 206 can be scraped for metadata to generate the action-based link preview 204. The metadata for the action-based link in the example scenario 200 can identify a user associated with the action-based link (Palo Alto Material Supply Co.), as well as an action associated with the action-based link (Contact Palo Alto Material Supply Co.). This metadata can also be used to create the call to action object 208 and/or the action-based link preview 204. The metadata can also include additional useful information associated with the action-based link. For example, in the example scenario 200, a response indicator 216 states: "This entity generally responds within 24 hrs." This designation can be made based on past response information associated with the Palo Alto Material Supply Co. For example, if a user responds to at least 75% of all messages within 24 hours, the user can be identified as an entity that "generally responds within 24 hrs."

Figure 3A:
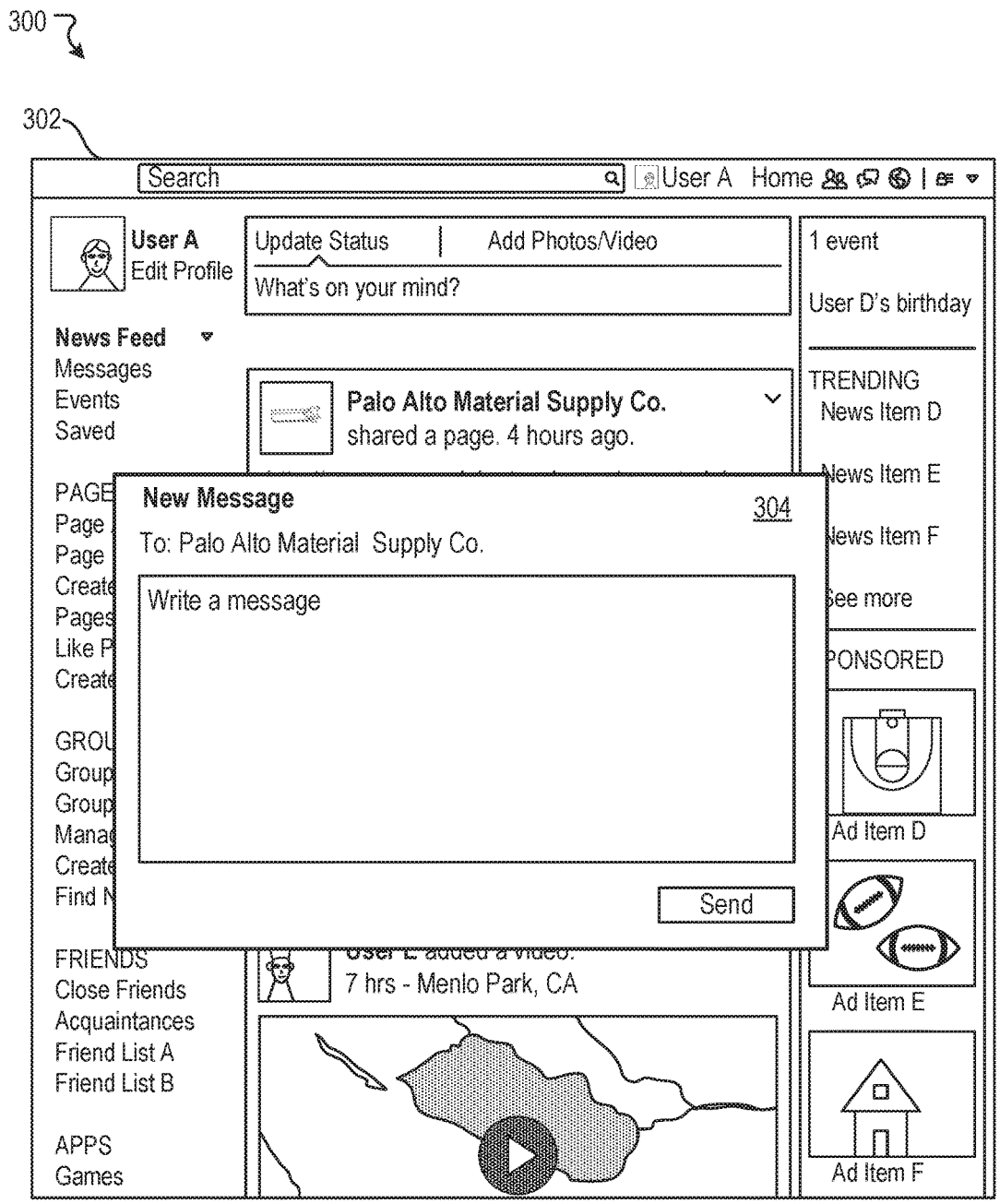
FIGS. 3A-C illustrate various messaging interfaces, according to various embodiments of the present disclosure.
Figure 3B:
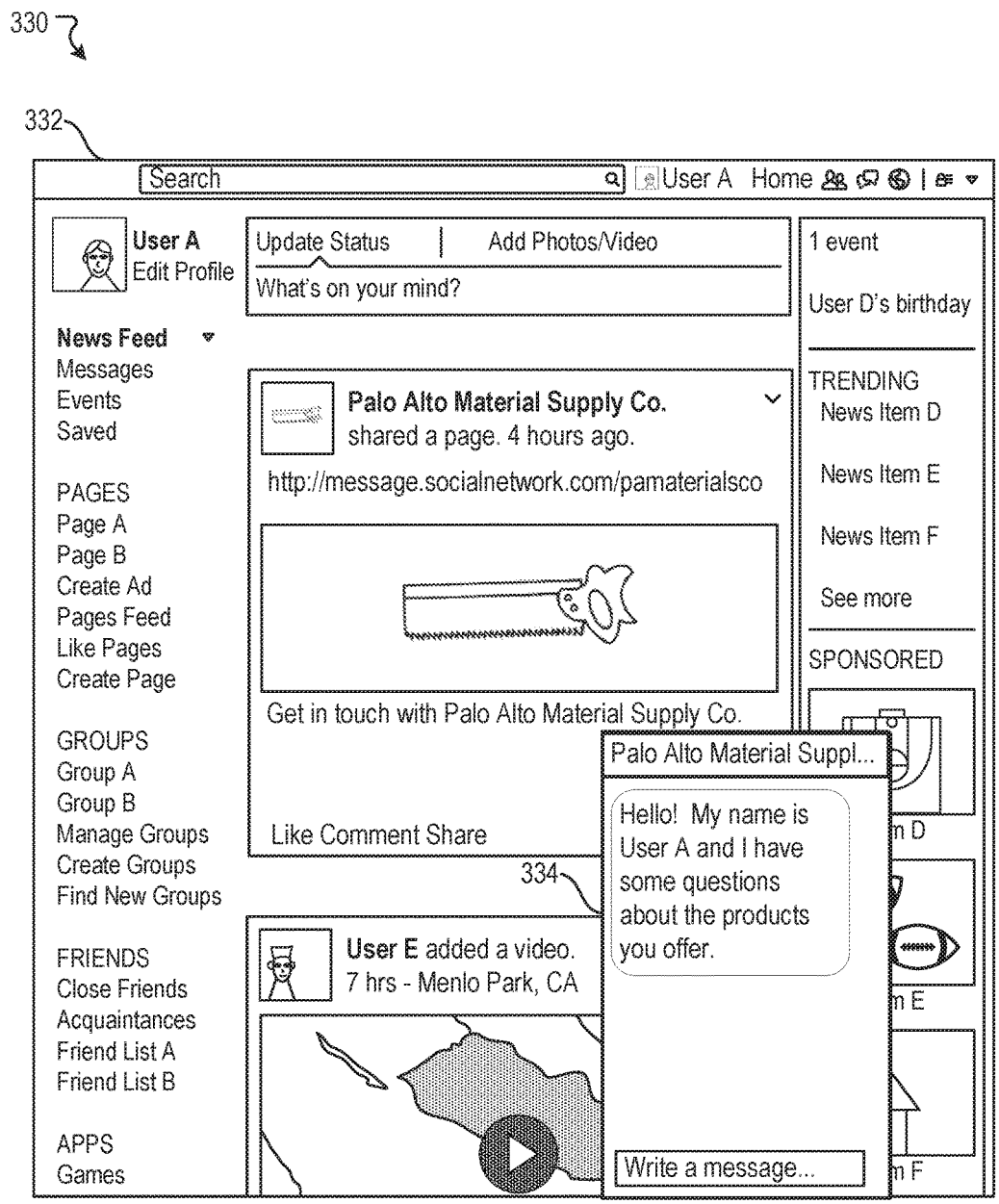
Figure 3C:
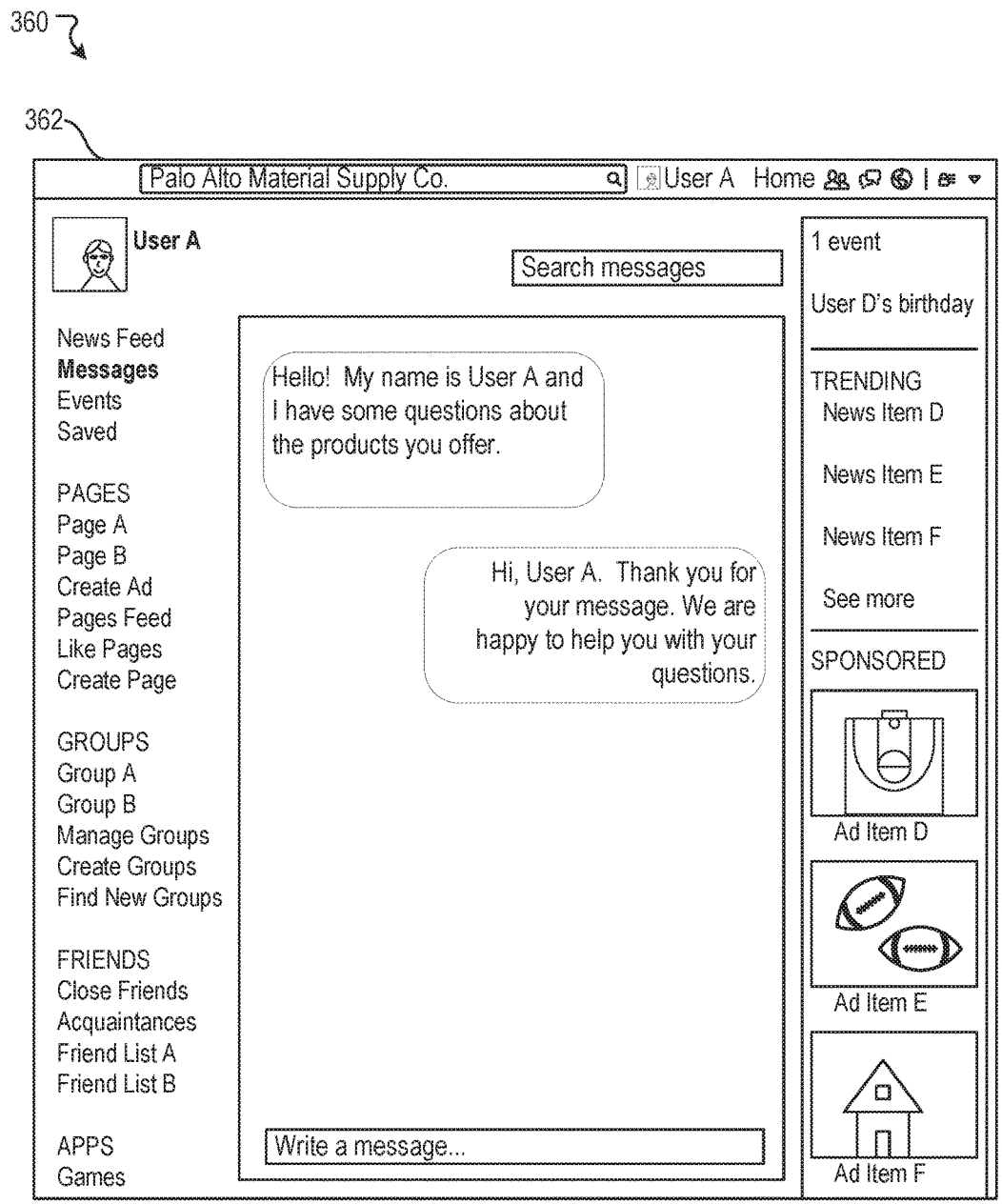

When a user selects an action-based link, various actions can be taken based on that selection. For example, it could be the case that there are multiple messaging interfaces available, and one messaging interface is selected. FIGS. 3A-C provide various examples of different messaging interfaces. FIG. 3A shows an example scenario 300 including a browser-based pop-up messaging window interface 302, in which a messaging window 304 is presented over the news feed shown in FIG. 2. FIG. 3B shows an example scenario 330 including a browser-based chat box messaging interface 332, in which a chat box 334 is opened up over the news feed shown in FIG. 2. FIG. 3C shows an example scenario 360 including a browser-based messaging page interface 362. While the various interfaces depicted in FIGS. 3A-C each depict different web browser-based messaging interfaces, the social networking system may also utilize various mobile messaging interfaces. For example, the social networking system can include a mobile web browser-based messaging interface, and a mobile messaging application interface.

In certain embodiments, an appropriate messaging interface can be selected based on various selection criteria. In one embodiment, the selection criteria can comprise a computing device determination. For example, the computing device determination can determine whether the user who has selected an action-based link is using a mobile device (e.g., cell phone, or table) or a standard computing device (e.g., a laptop or desktop). If the user is using a mobile device, the messaging interface options can be narrowed to mobile web browser-based messaging interfaces or a mobile messaging application interface, whereas if a user is using a standard computing device, the messaging interface options can be narrowed to standard web browser-based messaging interfaces (such as those shown in FIGS. 3A-C). The selection criteria can also comprise an access method determination. Referring back to FIG. 2, if the user directly clicks the web link 206, the result may be a different messaging interface than if the user had clicked on the call to action object 208. For example, if the user selects the web link 206, this may result in the browser-based messaging page interface 362 of FIG. 3C, whereas if the user selects the call to action object 208, the browser-based pop-up window messaging interface 302 of FIG. 3A, could be used.

Figure 4:
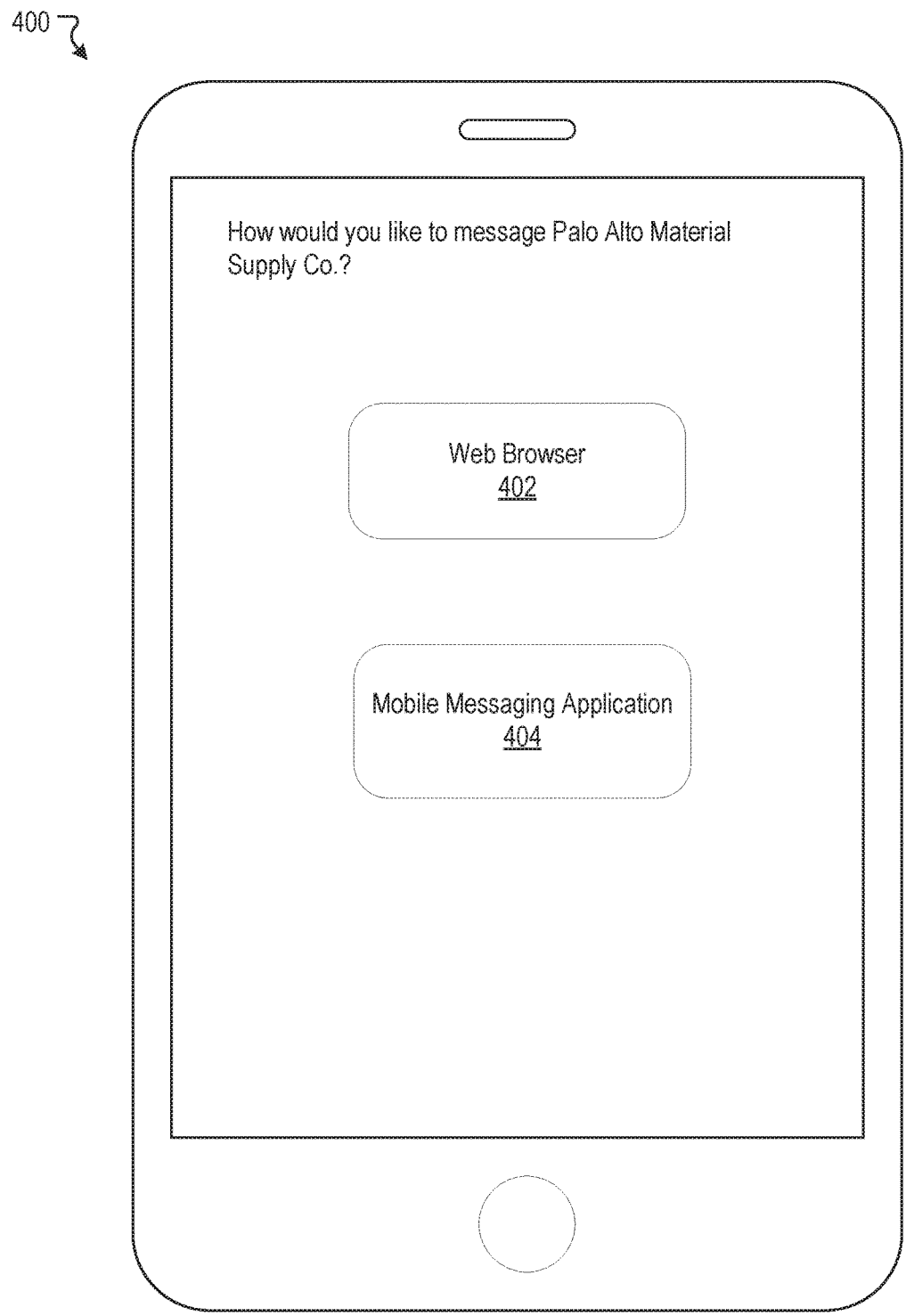
FIG. 4 illustrates an example messaging interface selection landing page, according to an embodiment of the present disclosure.

In certain embodiments, rather than selecting one particular messaging interface, the user may be presented with an option to select a messaging interface. For example, the user can select from all available messaging interfaces, or can select from a sub-selection of messaging interfaces that have been selected based on selection criteria. FIG. 4 shows an example scenario 400 including a mobile device messaging interface selection landing page. In this scenario, it has been determined that the user is on a mobile device. As such, the user is only presented with options compatible with mobile devices: a mobile-device based web browser messaging interface option 402, and a mobile messaging application option 404. In other words, a sub-selection of messaging interfaces have been selected based on the determination that the user is on a mobile device, and only those messaging interfaces compatible with mobile devices are presented to the user.

In certain embodiments, a user must be logged into a social networking system in order to exchange messages with another user. In such cases, if a user selects a messaging action-based link without being logged in, the user may be directed to a log-in page. Furthermore, it may be problematic if messaging action-based links are shared on third party platforms which perform scraping and previewing. This is because the third party platform's scrapers may not be logged into the social networking system, resulting in a preview that is based on a log-in page for the social networking system, rather than the desired messaging interface. In order to address this issue, a logged-out version of a messaging interface can be created such that a third-party platform scraper can be provided with sufficient metadata to create an accurate preview.

In certain embodiments, the action-based link can be presented in a non-textual manner. For example, the action-based link can be presented as a QR code, such that a user can "select" the action-based link by scanning in the QR code. In this case, scanning of the QR code would result in the associated action being taken, e.g., opening up a messaging interface if the action-based link is a messaging action-based link.

Furthermore, in certain embodiments, users may be provided with data to analyze the effectiveness of action-based links. For example, if an entity having an entity page on a social networking system has shared a messaging action-based link on the social networking system, the entity may be interested in determining how effective the messaging action-based link has been in getting other users to send messages to the entity. The entity can be provided with data as to how many users have sent a message to the entity via the action-based link, and how many users have sent a message by other means (e.g., by going to the entity's page on the social networking system to send a message).

Figure 5:
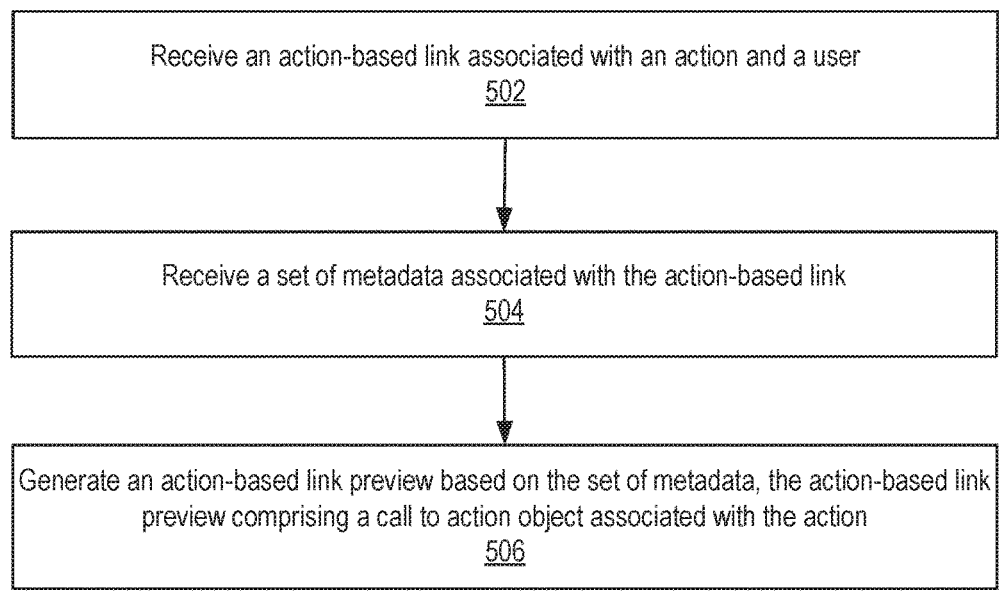
FIG. 5 illustrates an example method associated with generating an action-based link preview, according to an embodiment of the present disclosure.

FIG. 5 illustrates an example method 500 associated with generating an action-based link preview, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive an action-based link associated with an action and a user. At block 504, the example method 500 can receive a set of metadata associated with the action-based link. At block 506, the example method 500 can generate an action-based link preview based on the set of metadata, the action-based link preview comprising a call to action object associated with the action. Other suitable techniques that incorporate various features and embodiments of the present technology are possible.

Social Networking System—Example Implementation

Figure 6:
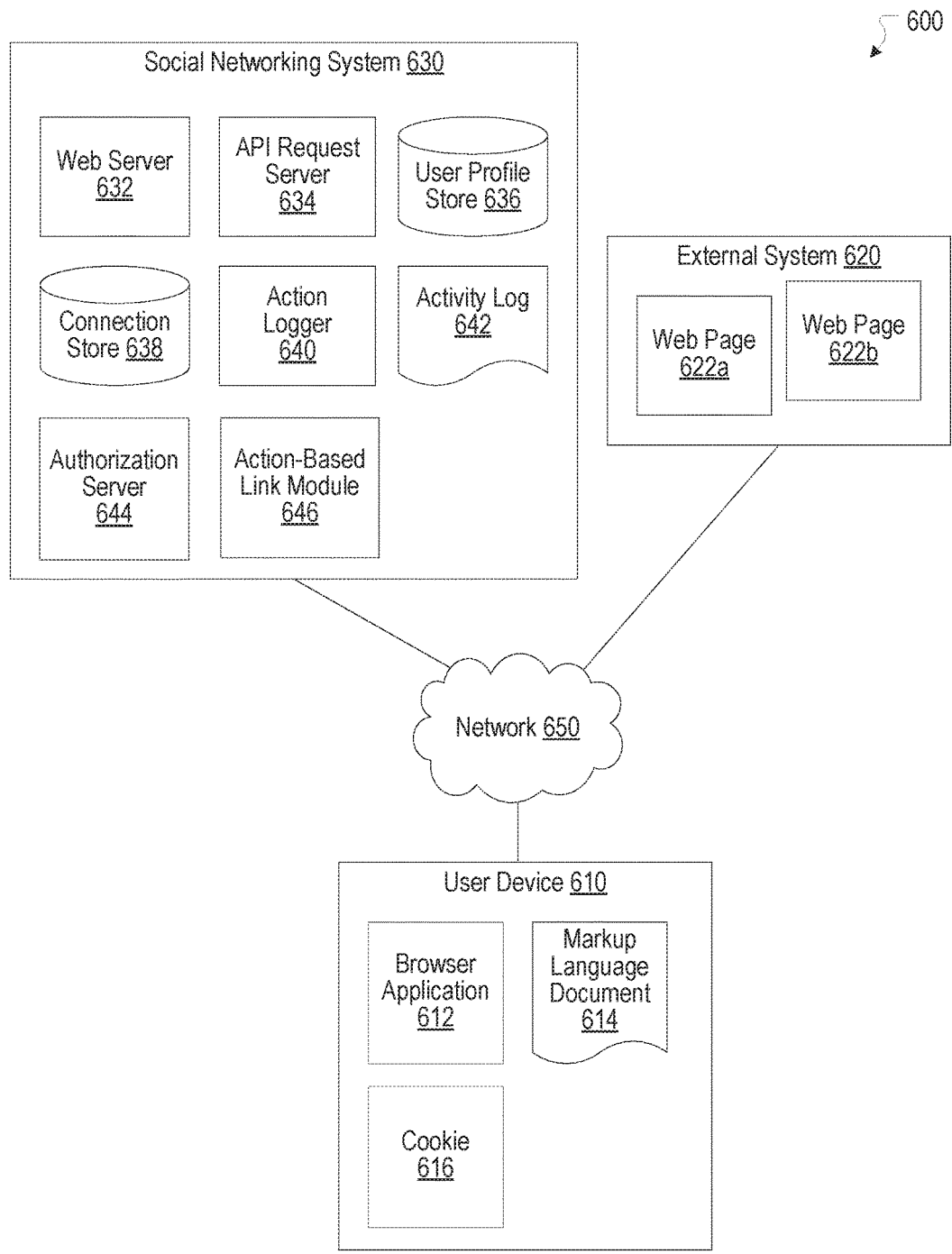
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an action-based link module 646. The action-based link module 646 can, for example, be implemented as the action-based link module 102, as discussed in more detail herein. As discussed previously, it should be appreciated that there can be many variations or other possibilities. For example, in some embodiments, one or more functionalities of the action-based link module 646 can be implemented in the user device 610.

Hardware Implementation

Figure 7:
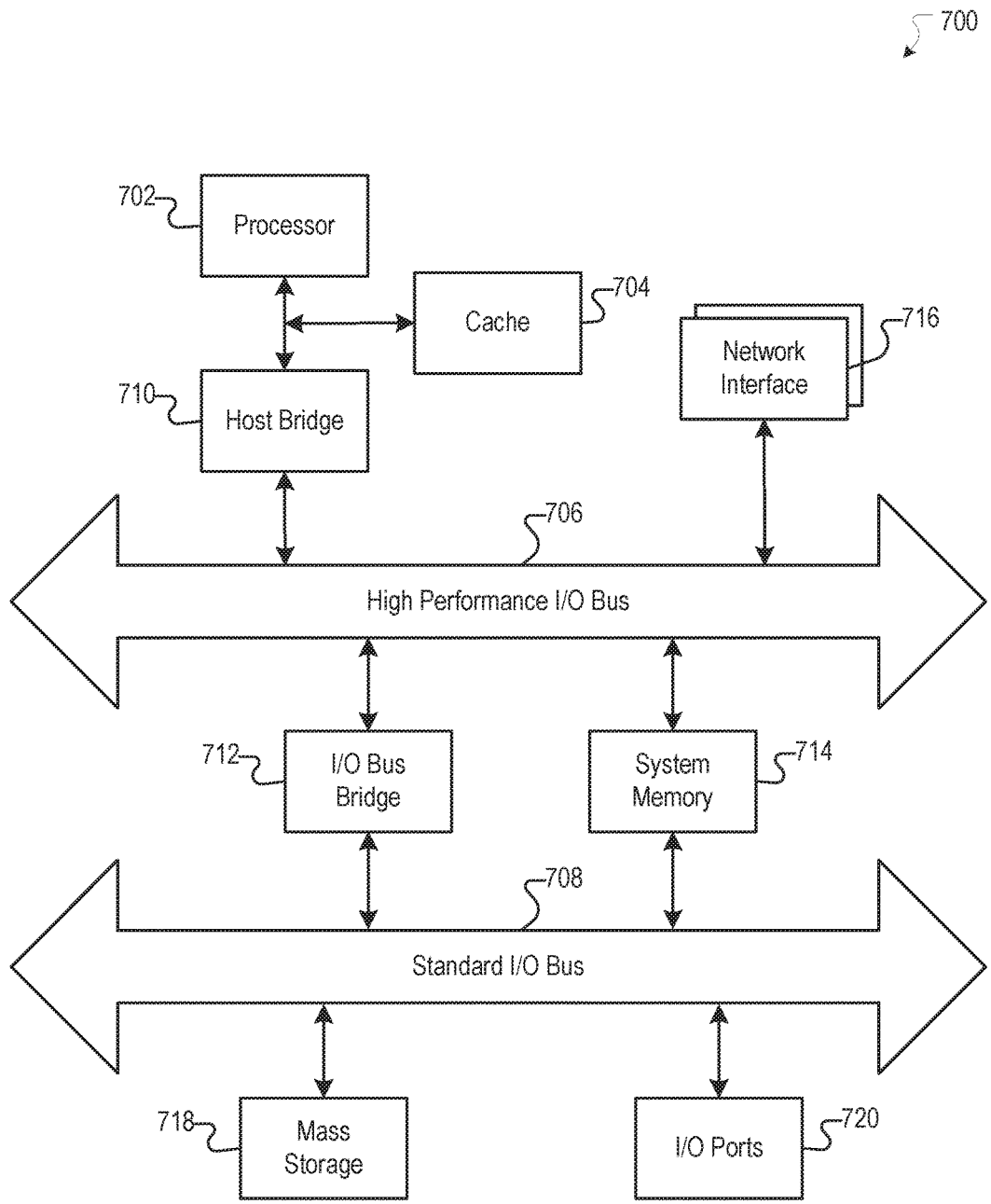
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, an action-based link associated with an action and a user, wherein the action and the user associated with the action-based link are indicated by a manner in which a uniform resource locator (URL) corresponding to the action-based link is formatted and the action-based link is associated with a plurality of user interfaces;
generating, by the computing system, a call-to-action object for publication to a social networking system newsfeed associated with a first user, wherein the call-to-action object can be selected by the first user to take the action associated with the action-based link, the call-to-action object comprises a label identifying the action to be taken if the call-to-action object is selected, and the label is automatically generated based on metadata associated with the action-based link;
receiving, by the computing system, an indication that the call-to-action object has been selected by the first user on a first computing device;
determining, by the computing system, whether the first computing device is a mobile device;
selecting, by the computing system, a first subset of user interfaces of the plurality of user interfaces based on the determining whether the first computing device is a mobile device; and
providing, by the computing system, a first user interface of the first subset of user interfaces to be loaded on the first computing device.

2. The computer-implemented method of claim 1, wherein the action-based link is a messaging action-based link and the action is messaging the user.

3. The computer-implemented method of claim 2, wherein the receiving the action-based link comprises receiving the action-based link for publication to a social networking system, wherein publication to the social networking system comprises publication to a plurality of newsfeeds associated with a plurality of users on the social networking system.

4. The computer-implemented method of claim 2, wherein the plurality of interfaces comprises a plurality of messaging interfaces, and the plurality of messaging interfaces comprises at least three of:
a mobile messaging application interface presented in a mobile messaging application,
a browser-based pop-up messaging window interface in which a pop-up messaging window is overlaid on another interface presented within a web browser,
a browser-based chat box messaging interface in which a chat box is overlaid on another interface presented within a web browser, and
a browser-based messaging page interface, which includes a web page directed to exchanging messages.

5. A system comprising:
at least one processor; and
a memory storing instructions that, when executed by the at least one processor, cause the system to perform a method comprising:
receiving an action-based link associated with an action and a user, wherein the action and the user associated with the action-based link are indicated by a manner in which a uniform resource locator (URL) corresponding to the action-based link is formatted and the action-based link is associated with a plurality of user interfaces;
generating a call-to-action object for publication to a social networking system newsfeed associated with a first user, wherein the call-to-action object can be selected by the first user to take the action associated with the action-based link, the call-to-action object comprises a label identifying the action to be taken if the call-to-action object is selected, and the label is automatically generated based on metadata associated with the action-based link;
receiving an indication that the call-to-action object has been selected by the first user on a first computing device;
determining whether the first computing device is a mobile device;
selecting a first subset of user interfaces of the plurality of user interfaces based on the determining whether the first computing device is a mobile device; and
providing a first user interface of the first subset of user interfaces to be loaded on the first computing device.

6. The system of claim 5, wherein the action-based link is a messaging action-based link and the action is messaging the user.

7. The system of claim 6, wherein the receiving the action-based link comprises receiving the action-based link for publication to a social networking system, wherein publication to the social networking system comprises publication to a plurality of newsfeeds associated with a plurality of users on the social networking system.

8. A non-transitory computer-readable storage medium including instructions that, when executed by at least one processor of a computing system, cause the computing system to perform a method comprising:
receiving an action-based link associated with an action and a user, wherein the action and the user associated with the action-based link are indicated by a manner in which a uniform resource locator (URL) corresponding to the action-based link is formatted and the action-based link is associated with a plurality of user interfaces;
generating a call-to-action object for publication to a social networking system newsfeed associated with a first user, wherein the call-to-action object can be selected by the first user to take the action associated with the action-based link, the call-to-action object comprises a label identifying the action to be taken if the call-to-action object is selected, and the label is automatically generated based on metadata associated with the action-based link;
receiving an indication that the call-to-action object has been selected by the first user on a first computing device;
determining whether the first computing device is a mobile device;
selecting a first subset of user interfaces of the plurality of user interfaces based on the determining whether the first computing device is a mobile device; and
providing a first user interface of the first subset of user interfaces to be loaded on the first computing device.

9. The non-transitory computer-readable storage medium of claim 8, wherein the action-based link is a messaging action-based link and the action is messaging the user.

10. The non-transitory computer-readable storage medium of claim 9, wherein the receiving the action-based link comprises receiving the action-based link for publication to a social networking system, wherein publication to the social networking system comprises publication to a plurality of newsfeeds associated with a plurality of users on the social networking system.

11. The computer-implemented method of claim 2, further comprising:
providing, by the computing system, data associated with a number of users that have sent a message via the action-based link.

12. The computer-implemented method of claim 3, further comprising:
providing, by the computing system, a logged-out version of a messaging interface for preview by a third party platform scraper.

13. The computer-implemented method of claim 1, wherein the action-based link is presented as a QR code.

14. The system of claim 6, further comprising:
providing data associated with a number of users that have sent a message via the action-based link.

15. The system of claim 7, further comprising:
providing a logged-out version of a messaging interface for preview by a third party platform scraper.

16. The system of claim 5, wherein the action-based link is presented as a QR code.

17. The non-transitory computer-readable storage medium of claim 9, further comprising:
providing data associated with a number of users that have sent a message via the action-based link.

18. The non-transitory computer-readable storage medium of claim 10, further comprising:
Providing a logged-out version of a messaging interface for preview by a third party platform scraper.

19. The non-transitory computer-readable storage medium of claim 8, wherein the action-based link is presented as a QR code.

* * * * *